US012560859B2

(12) United States Patent
Tsai

(10) Patent No.: US 12,560,859 B2
(45) Date of Patent: Feb. 24, 2026

(54) WHEEL AND PROJECTION DEVICE

(71) Applicant: Coretronic Corporation, Hsin-Chu (TW)

(72) Inventor: Chia-Lun Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 720 days.

(21) Appl. No.: 17/903,960

(22) Filed: Sep. 6, 2022

(65) Prior Publication Data

US 2023/0103144 A1 Mar. 30, 2023

(30) Foreign Application Priority Data

Sep. 27, 2021 (CN) .......................... 202122340670.6

(51) Int. Cl.
*G03B 21/20* (2006.01)

(52) U.S. Cl.
CPC .................................. *G03B 21/204* (2013.01)

(58) Field of Classification Search
None
See application file for complete search history.

(56) References Cited

U.S. PATENT DOCUMENTS

2019/0094671 A1* 3/2019 Ikeo ..................... G02B 26/008

FOREIGN PATENT DOCUMENTS

| | | |
|---|---|---|
| CN | 205091534 | 3/2016 |
| CN | 205091534 U * | 3/2016 |
| CN | 209525553 | 10/2019 |
| CN | 114675480 | 6/2022 |
| TW | 201610549 | 3/2016 |

* cited by examiner

*Primary Examiner* — Bao-Luan Q Le
*Assistant Examiner* — Danell L Owens
(74) *Attorney, Agent, or Firm* — JCIPRNET

(57) ABSTRACT

A wheel includes a substrate and an optical layer. The substrate includes an inner substrate and multiple wave-shaped structures. The inner substrate has a first surface and a second surface opposite to the first surface. The optical layer is disposed on the first surface. An excitation beam is incident toward the optical layer. The wave-shaped structures are connected to and disposed around the inner substrate. A first portion of the wave-shaped structures connected to the inner substrate include at least a slope. A projection device is provided.

18 Claims, 8 Drawing Sheets

200A $\otimes$ D1

$210\begin{cases}212\\214\end{cases}$

230

212

S1

220

CP

C

CP1

2142

214

2144

200

FIG. 2A $210\begin{cases} 212 \\ 214 \end{cases}$

⊗ D1

200A

WHEEL AND PROJECTION DEVICE

CROSS-REFERENCE TO RELATED APPLICATION

This application claims the priority benefit of China application serial no. 202122340670.6, filed on Sep. 27, 2021. The entirety of the above-mentioned patent application is hereby incorporated by reference herein and made a part of this specification.

BACKGROUND

Technology Field

The disclosure relates to a wheel and a projection device using the same.

Description of Related Art

Conventional wheels (e.g., a phosphor wheel) usually use a metal substrate as a heat dissipation substrate, and its material is generally aluminum or aluminum alloy. To increase the heat dissipation efficiency of a wheel, stamping or machining is usually used to form a boss structure or a groove structure on the front, the back, or both sides of the heat dissipation substrate to increase the surface area of the heat dissipation substrate. In addition, the boss structures may produce turbulence or enhance convection during the high-speed rotation of the wheel. Through the turbulence or convection, the heat energy accumulated by the wheel can be quickly removed, so the temperature of the optical layer (e.g., the fluorescent layer and the reflective layer) of the wheel can be reduced to improve the conversion efficiency of the wheel. However, the strength of the outer structure of the stamped aluminum substrate is weak and prone to deformation, which causes the outer edge of the aluminum substrate to deflect too much and in turn reduces the conversion efficiency of the wheel.

Another type of wheel uses a ceramic substrate with high thermal conductivity as a heat dissipation substrate in order to increase the sintering temperature of the wheel during the manufacturing process. When a substrate is made of metal, the optical layer constrained by the substrate can withstand a maximum temperature up to 500° C. only. Therefore, the temperature for sintering and molding is required to be lower than the maximum temperature of the metal substrate, and consequently the material for the optical layer is constrained. Although the temperature resistance of the ceramic substrate can be increased up to 600° C. or higher, the ceramic substrate is not easy to change its shape by stamping or processing, so heat dissipation bosses are usually coated or sintered on the ceramic substrate to improve the heat dissipation and reduce the temperature of the wheel so as to increase the conversion efficiency of the wheel. However, the ceramic substrate itself is a brittle material and susceptible to the generation of hidden cracks caused by the substrate forming and processing process. In addition, when a heat dissipation boss is coated on the surface of the substrate, the weight of the substrate may be increased, the wheel is then more likely to have cracks during the operation, and the reliability of the wheel is affected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a wheel with favorable structural strength and good heat dissipation effect.

The disclosure provides a projection device using the wheel, so the heat dissipation effect of the projection device is good.

An embodiment of the disclosure provides a wheel including a substrate and an optical layer. The substrate includes an inner substrate and multiple wave-shaped structures. The inner substrate has a first surface and a second surface opposite to the first surface. The optical layer is disposed on the first surface, and an excitation beam is incident toward the optical layer. The wave-shaped structures are connected to the inner substrate. The wave-shaped structures are disposed around the inner substrate. A first portion of at least one of the wave-shaped structures connected to the inner substrate has at least a slope.

In an embodiment of the disclosure, the wave-shaped structures are connected to one another, and a second portion of the at least one of the wave-shaped structures connected to an adjacent wave-shaped structure has at least a slope.

In an embodiment of the disclosure, along a direction from the first surface to the second surface, each wave-shaped structure is a convex structure or a concave structure and satisfies $1 \leq CH/T \leq 3$ or $1 \leq CL/T \leq 3$, where CH is a distance between the convex structure and an extension of the first surface, CL is a distance between the concave structure and the extension of the second surface, and T is a thickness of the inner substrate.

In an embodiment of the disclosure, the wheel satisfies $CH > T1$, where T1 is a thickness of the optical layer.

In an embodiment of the disclosure, $CH > CL$.

In an embodiment of the disclosure, a central angle occupied by each convex structure is less than a central angle occupied by each concave structure.

In an embodiment of the disclosure, the first surface or the second surface has multiple convex portions, and the convex portions are disposed between the optical layer and the center and disposed around the center.

In an embodiment of the disclosure, the wheel satisfies $CH > TH$ or $CL > TH$, where TH is a height of each convex portion.

In an embodiment of the disclosure, an extension of a line between each convex portion and the center passes through one of the wave-shaped structures.

In an embodiment of the disclosure, the number of the wave-shaped structures is greater than the number of the convex portions, and a central angle occupied by each wave-shaped structure is less than a central angle occupied by each convex portion.

In an embodiment of the disclosure, the second surface or the first surface has multiple concave portions opposite to the convex portions, and positions of the concave portions are respectively aligned with positions of the convex portions and satisfy $TH = TL$, where TH is a height of each convex portion, and TL is a depth of each concave portion.

In an embodiment of the disclosure, there is an opening between a part of the wave-shaped structures and an adjacent wave-shaped structure, so that the wave-shaped structures are discontinuous in a direction perpendicular to a radial direction of the inner substrate.

An embodiment of the disclosure provides a projection device including an illumination system, a light valve, and a projection lens. The illumination system is configured to provide an illumination beam. The light valve is disposed on a transmission path of the illumination beam to convert the illumination beam into an image beam. The projection lens is disposed on a transmission path of the image beam to project the image beam out of the projection device. The illumination system includes a light source and a wheel. The light source is configured to emit an excitation beam. The wheel includes a substrate and an optical layer. The substrate includes an inner substrate and multiple wave-shaped structures. The inner substrate has a first surface and a second surface opposite to the first surface. The optical layer is disposed on the first surface. The excitation beam is incident toward the optical layer. The wave-shaped structures are connected to the inner substrate. The wave-shaped structures are disposed around the inner substrate. A first portion of at least one of the wave-shaped structures connected to the inner substrate has at least a slope.

In an embodiment of the disclosure, the wave-shaped structures are connected to one another, and a second portion of the at least one of the wave-shaped structures connected to an adjacent wave-shaped structure has at least a slope.

In an embodiment of the disclosure, along a direction from the first surface to the second surface, each wave-shaped structure is a convex structure or a concave structure and satisfies $1 \leq CH/T \leq 3$ or $1 \leq CL/T \leq 3$, where CH is a distance between the convex structure and an extension of the first surface, CL is a distance between the concave structure and the extension of the second surface, and T is a thickness of the inner substrate.

In an embodiment of the disclosure, a central angle occupied by each convex structure is less than a central angle occupied by each concave structure.

In an embodiment of the disclosure, the first surface or the second surface includes multiple convex portions, and the convex portions are disposed between the optical layer and the center and disposed around the center.

In an embodiment of the disclosure, the number of the wave-shaped structures is greater than the number of the convex portions, and a central angle occupied by each wave-shaped structure is less than a central angle occupied by each convex portion.

In an embodiment of the disclosure, the second surface or the first surface has multiple concave portions opposite to the convex portions, and positions of the concave portions are respectively aligned with positions of the convex portions and satisfy TH=TL, where TH is a height of each convex portion, and TL is a depth of each concave portion.

In an embodiment of the disclosure, there is an opening between a second portion of the at least one of the wave-shaped structures and an adjacent wave-shaped structure, so that the wave-shaped structures are discontinuous in a direction perpendicular to a radial direction of the inner substrate.

In summary, in an embodiment of the disclosure, wave-shaped structures are disposed on the outer side of the substrate in the wheel, so when the wheel rotates at a high speed, the wave-shaped structures on the outer side guide the wind flow and the wind flow is blown effectively to the optical layer. The heat source of the optical layer is effectively removed, the temperature of the optical layer is reduced, and thereby the conversion efficiency of the optical layer is improved. Furthermore, since the first portion of at least one of the wave-shaped structures connected to the inner substrate has a slope, and therefore the structural strength of the outer side of the substrate is improved. Accordingly, when the wheel rotates at a high speed, the oscillation generated on the outer side of the substrate is reduced, both the noise generated by the wheel and the damage to the motor are reduced, and the life of the product is improved.

In addition, the projection device uses the wheel, so in addition to the advantages, the energy generation efficiency of the projection device in the image beam is also improved.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 2A is a schematic top view of the wheel in FIG. 1.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A"

component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
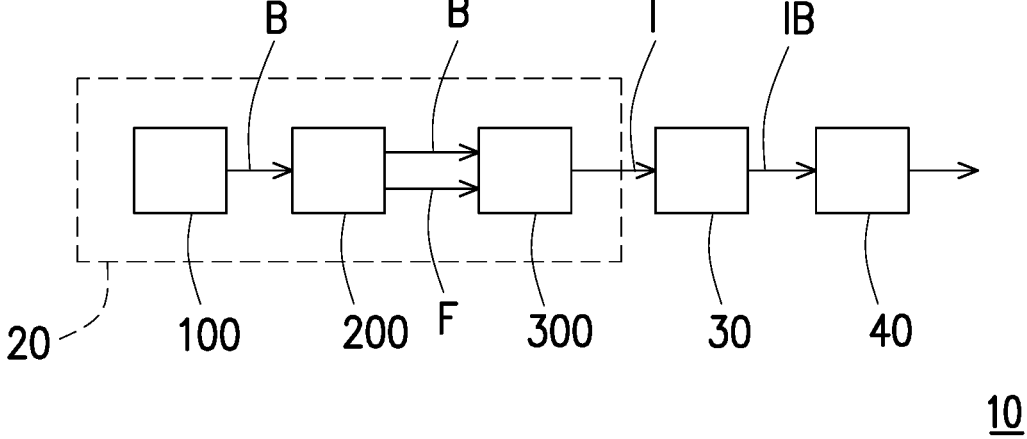
FIG. 1 is a schematic view of a projection device according to a first embodiment of the disclosure.

FIG. 1 is a schematic view of a projection device according to a first embodiment of the disclosure. Referring to FIG. 1, an embodiment of the disclosure provides a projection device 10 including an illumination system 20, a light valve 30, and a projection lens 40. The illumination system 20 is configured to provide an illumination beam I. The light valve 30 is disposed on a transmission path of the illumination beam I and configured to convert the illumination beam I into an image beam IB. The projection lens 40 is disposed on the transmission path of the image beam IB and configured to project the image beam IB out of the projection device 10. The illumination system 20 includes a light source 100 and a wheel 200. The light source 100 is configured to emit an excitation beam B.

In the embodiment, the illumination system 20 further includes a homogenizing element 300, the wheel 200 is a wavelength conversion element (e.g., a phosphor wheel), and the illumination beam I includes the excitation beam B and a converted beam F. The wheel 200 sequentially enters the transmission path of the excitation beam B. In one time sequence, the excitation beam B is incident on an optical layer 220 (shown in FIG. 2A) of the wheel 200, the excitation beam B is converted into the converted beam F, and the converted beam F is transmitted to the homogenizing element 300. In another time sequence, the excitation beam B passes through a non-optical layer 230 (shown in FIG. 2A) of the wheel 200 and is transmitted to the homogenizing element 300. The converted beam F and the excitation beam B sequentially enter the homogenizing element 300 to form the illumination beam I, so that the illumination system 20 outputs the illumination beam I.

Specifically, for example, the light valve 30 of the embodiment is a spatial light modulator, such as a digital micro-mirror device (DMD), a liquid-crystal-on-silicon (LCOS) panel, a liquid crystal panel, and the like. In addition, the projection lens 40 includes a combination of one or more optical lenses having diopters, for example. For example, optical lenses include various combinations of non-planar lenses, such as biconcave lenses, biconvex lenses, meniscus lenses, convex-concave lenses, plano-convex lenses, plano-concave lenses, and the like. The disclosure does not limit the type and mode of the projection lens 40.

In the embodiment, for example, the light source 100 is a laser diode (LD), a light emitting diode (LED), other suitable light sources, or a combination thereof, and the disclosure is not limited thereto. In addition, the excitation beam B may be ultraviolet light, blue light, beams of other colors, or a combination thereof. The homogenizing element 300 is an integration rod, for example, and the lens array is a fly-eye lens array or other optical elements with a light homogenization effect, for example, but the disclosure is not limited thereto.

Figure 2A:
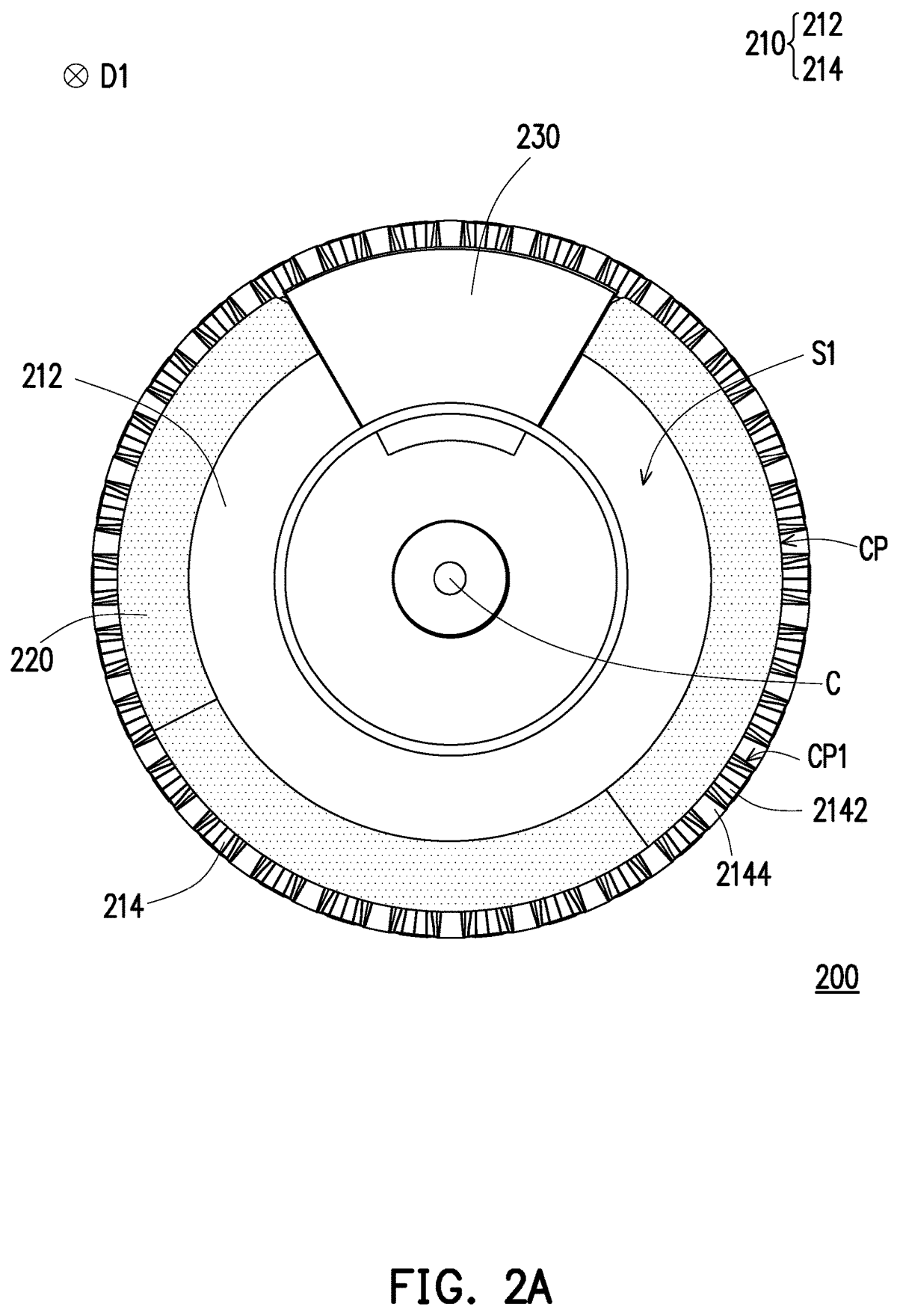
Figure 2B:
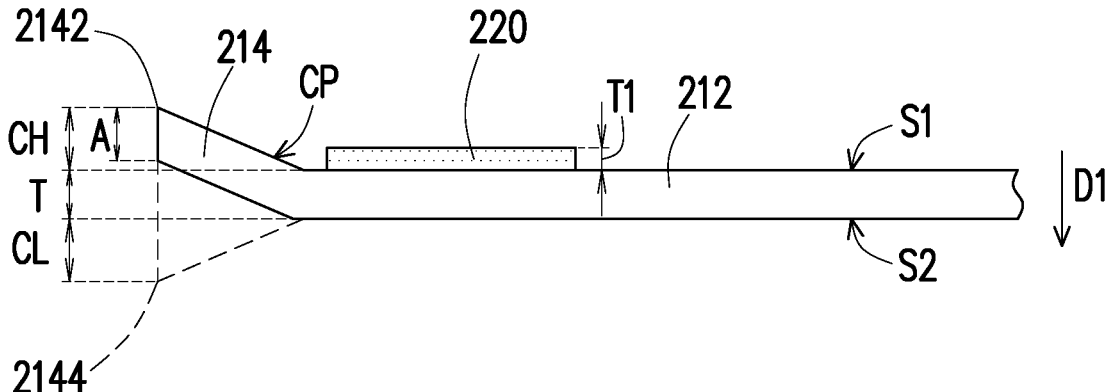
FIG. 2B is a schematic cross-sectional view of FIG. 2A.

FIG. 2A is a schematic top view of the wheel in FIG. 1. FIG. 2B is a schematic cross-sectional view of FIG. 2A. For a clear illustration of the relative relationship between a convex structure 2142 and a concave structure 2144, the concave structure 2144 is projected in the drawing in the cross-sectional view of FIG. 2B and is drawn with a dashed line.

Referring to both FIG. 2A and FIG. 2B, in the embodiment, the wheel 200 includes a substrate 210 and the optical layer 220. The material of the substrate 210 is preferably metal, such as aluminum or aluminum alloy, but the disclosure is not limited thereto. In the embodiment, the optical layer 220 is a wavelength conversion layer. The substrate 210 includes an inner substrate 212 and multiple wave-shaped structures 214. The inner substrate 212 has a first surface S1 and a second surface S2 opposite to the first surface S1. The optical layer 220 is disposed on the first surface S1. The excitation beam B (shown in FIG. 1) is incident toward the optical layer 220. The wave-shaped structure 214 is connected to outside of the inner substrate 212, the inner substrate 212 is round-shaped, and the wave-shaped structure 214 is disposed around the inner substrate 212. A first portion CP of one of the wave-shaped structure 214 which connected to the inner substrate 212 has at least a slope. In other words, according to the schematic cross-sectional view of FIG. 2B, the first portion CP of the wave-shaped structure 214 which connected to the inner substrate 212 could have an inclination with the same slope or continuous slope change, such as a hill (not shown), and the inclination is not vertical to the first surface S1 of the inner substrate 212. In one embodiment, the wave-shaped structure 214 is the outer side of the substrate 210 formed by stamping or the like, that is, the wave-shaped structure 214 and the inner substrate 212 are integrally formed. In an embodiment, the wheel 200 further includes the non-optical layer 230, and for example, the non-optical layer 230 may be any light-transmissive plate, such as a glass sheet.

In the embodiment, the wave-shaped structure 214 is a continuous structure. Specifically, each wave-shaped structure 214 is connected to one another, and a second portion CP1 between each wave-shaped structure 214 has at least a slope. In other words, the second portion CP1 (as shown in the side view of FIG. 3B) of the wave-shaped structure 214 which connected to an adjacent wave-shaped structure 214 could have an inclination with the same slope or continuous slope change, such as a hill (not shown), and the inclination is not vertical to the first surface S1 of the inner substrate 212.

Figure 3A:
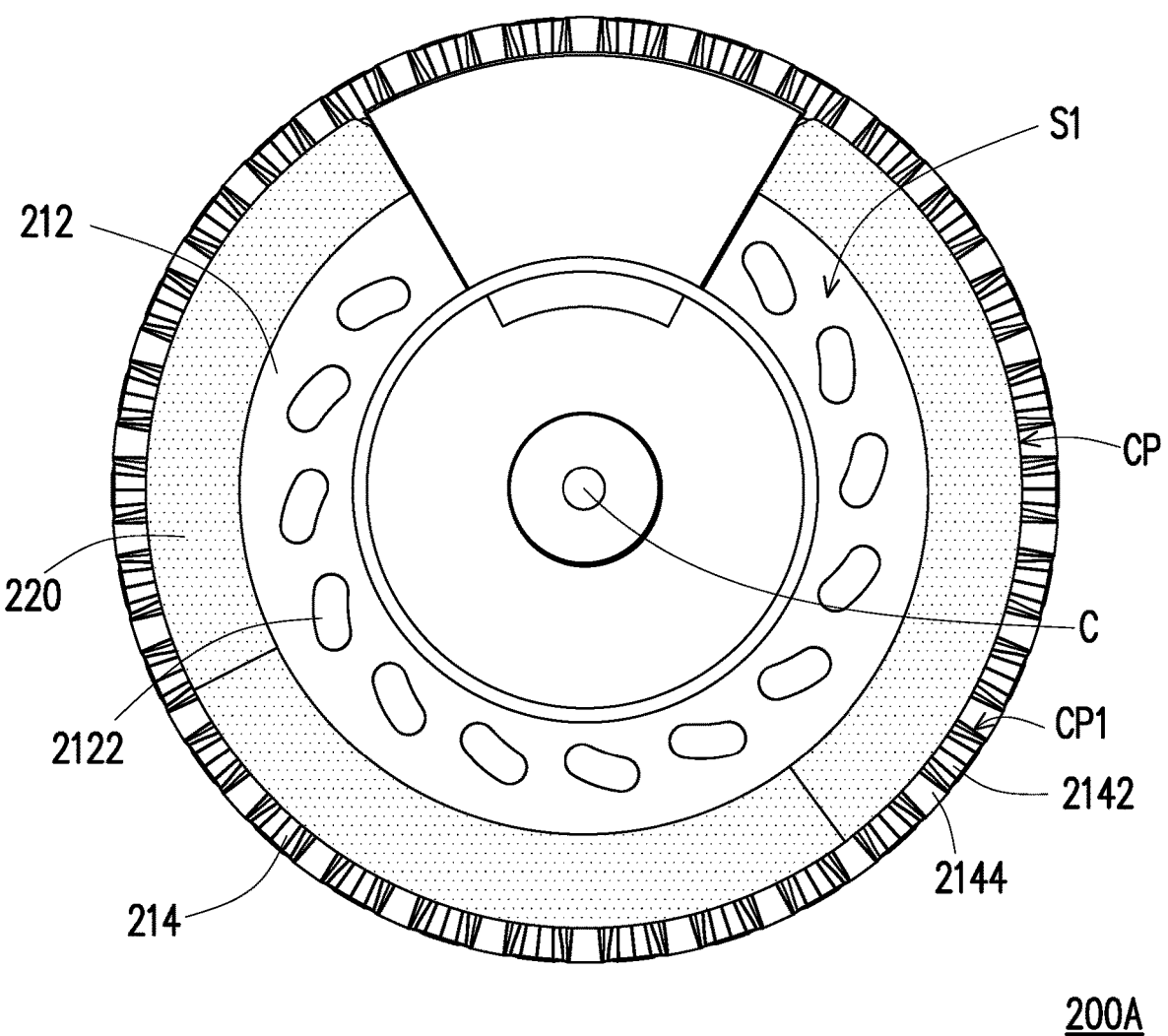
FIG. 3A is a schematic top view of a wheel according to a second embodiment of the disclosure.
Figure 3B:
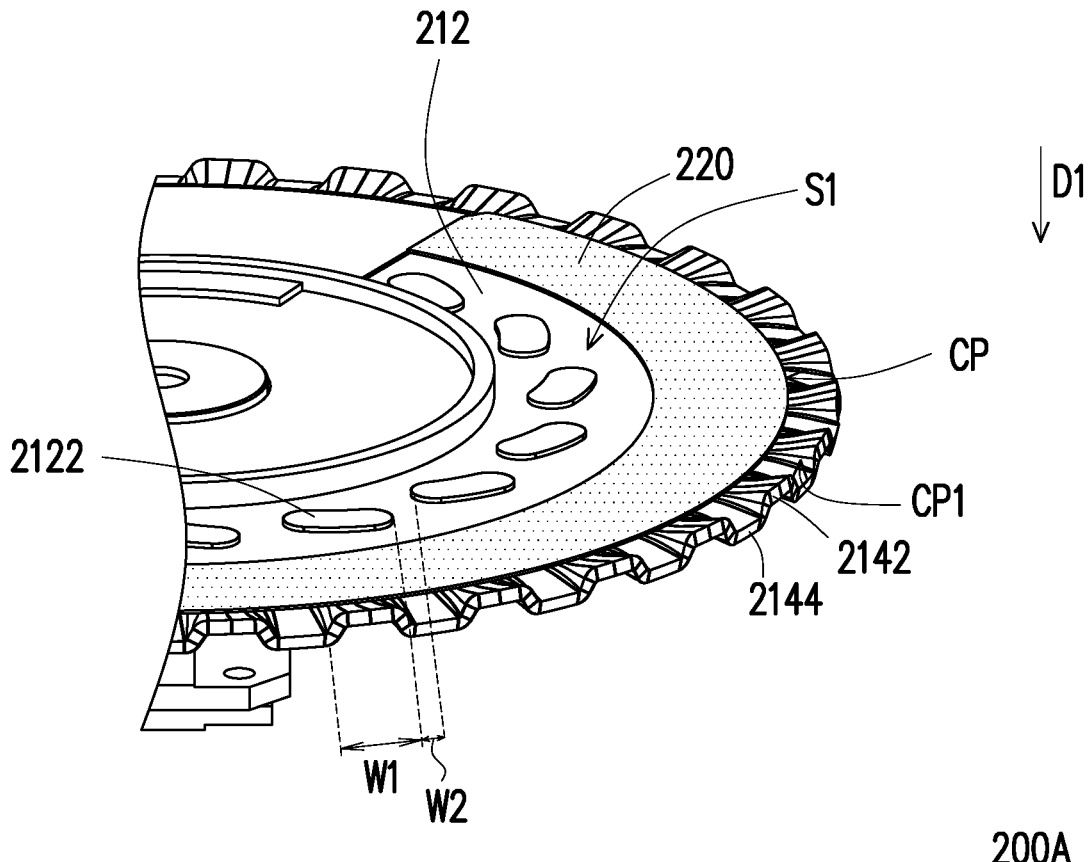
FIG. 3B is a schematic side view of FIG. 3A.

In the embodiment, along a direction D1 from the first surface S1 to the second surface S2, each wave-shaped structure 214 is the convex structure 2142 or the concave structure 2144 (as shown in the side view of FIG. 3B). As the height of the convex structure 2142 or the height of the concave structure 2144 increases, the turbulence property in the structure gets stronger. However, when the feasibility of the manufacturing process (e.g., stamping, molding, or computer numerical control (CNC) processing) is taken into account, the wave-shaped structure 214 preferably satisfies $1 \leq CH/T \leq 3$ or $1 \leq CL/T \leq 3$, where CH is the distance between the convex structure 2142 and the extension of the first surface S1, CL is the distance between the concave structure 2144 and the extension of the second surface S2, and T is the thickness of the inner substrate 212. In one embodiment, a thickness A of the wave-shaped structure 214 is substantially equal to a thickness T of the inner substrate 212. In addition, in one embodiment, the convex structure 2142 and the concave structure 2144 are disposed in a staggered manner.

In the embodiment, the wheel 200 also satisfies CH>T1, where T1 is the thickness of the optical layer 220. That is, the height of the convex structure 2142 is greater than the thickness of the optical layer 220.

In an embodiment, the wheel 200 also satisfies CH>CL. That is, the height of the convex structure 2142 is greater than the height of the concave structure 2144. In one embodiment, the height and shape of the convex structure 2142 and the height and shape of the concave structure 2144 may be adjusted according to different designs of the illumination systems 20.

In one embodiment, taking the center C as the center, the central angle occupied by each convex structure 2142 is less than the central angle occupied by each concave structure 2144. That is, the convex structure 2142 is distributed in a denser manner compared with the concave structure 2144.

Based on the above, in an embodiment of the disclosure, the wave-shaped structure 214 is disposed on the outer side of the substrate 210 of the wheel 200. Since the linear velocity at the outer side is the largest, when the wheel 200 rotates at a high speed, the airflow is turbulent by the wave-shaped structure 214 on the outer side, which improves the heat dissipation effect compared to a wheel without an outer wave-shaped structure. Furthermore, since the wave-shaped structure 214 is manufactured by stamping, the first portion CP of the wave-shaped structure 214 connected to the inner substrate 212 has a slope, and accordingly it is equivalent to the function of the "reinforcing rib" in the mechanism, which can increase the structural strength of the substrate 210, allow the peripheral of the substrate 210 to deflect slightly, and increase and stabilize the conversion efficiency of the optical layer 220. In addition, the projection device 10 uses the wheel 200, so in addition to the advantages, the energy generation efficiency of the projection device 10 in the image beam IB is also improved.

Figure 3C:
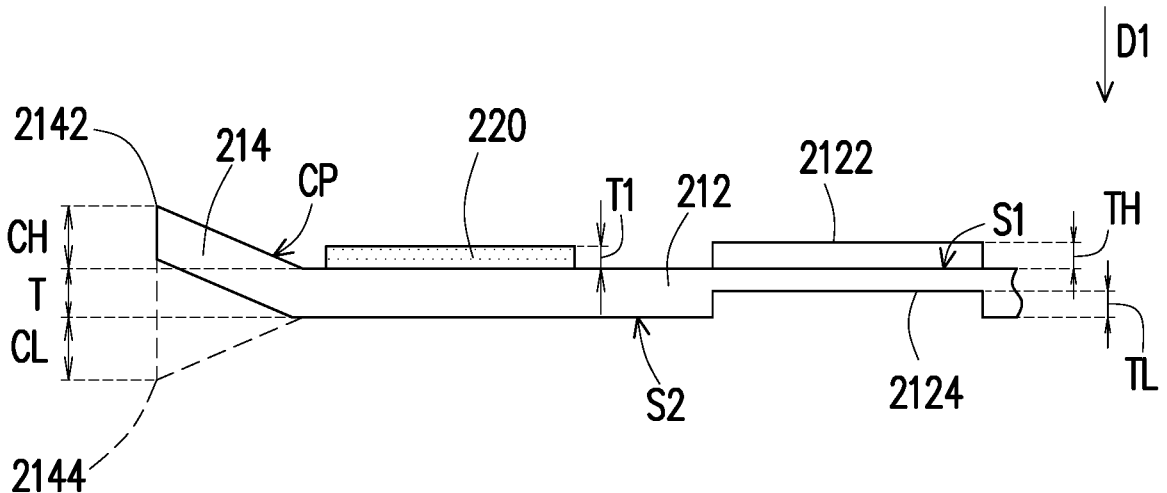
FIG. 3C is a schematic cross-sectional view of FIG. 3A.

FIG. 3A is a schematic top view of a wheel according to a second embodiment of the disclosure. FIG. 3B is a schematic side view of FIG. 3A. FIG. 3C is a schematic cross-sectional view of FIG. 3A. Referring to FIG. 3A to FIG. 3C altogether, a wheel 200A is similar to the wheel 200 of FIG. 2A, and the main differences are as follows. In the embodiment, the first surface S1 or the second surface S2 has multiple convex portions 2122 (FIG. 3A shows that the first surface S1 has convex portions 2122). The convex portions 2122 are disposed between the optical layer 220 and the center C and are disposed around the center C. The material of the convex portions 2122 may be the same as or different from the material of the inner substrate 212. Moreover, for example, the convex portions 2122 are formed by stamping or are disposed on the first surface S1 or the second surface S2 of the inner substrate 212 by bonding, sintering, or the like.

In the embodiment, the position of the convex portion 2122 is designed to correspond to the position of the wave-shaped structure 214, and this has a favorable heat dissipation effect. In a preferred embodiment, the extension of the line between each convex portion 2122 and the center C passes through one of the wave-shaped structures 214.

In one embodiment, as shown in FIG. 3C, the second surface S2 or the first surface S1 has multiple concave portions 2124 opposite to the multiple convex portions 2122. The positions of the concave portions 2124 are respectively aligned with the positions of the convex portions 2122 and satisfy TH=TL, where TH is the height difference between the height of each convex portion 2122 and the first surface S1/the second surface S2 where there is no convex portion 2122, and TL is the depth difference between the depth of each concave portion 2124 and the second surface S2/the first surface S1 where there is no concave portion 2124. That is, the convex portion 2122 is formed by stamping or the like on the opposite surface of the inner substrate 212, for example. Therefore, the material of the convex portion 2122 or the material of the concave portion 2124 is the same as the material of the inner substrate 212. Taking FIG. 3B as an example, the convex portion 2122 is formed after the inner substrate 212 is stamped from one side of the second surface S2 so that the first surface S1 has the convex portion 2122 and the second surface S2 has the concave portion 2124.

In the embodiment, the wheel 200A satisfies CH>TH or CL>TH, where TH is the height of each convex portion 2122. That is, the height of the convex structure 2142 or the height of the concave structure 2144 is greater than the height of the convex portion 2122.

In the embodiment, the number of wave-shaped structures 214 is greater than the number of convex portions 2122, so that the heat dissipation effect of the wheel 200A is favorable. Furthermore, taking the center C as the center, the central angle occupied by each wave-shaped structure 214 is less than the central angle occupied by each convex portion 2122, That is, the wave-shaped structures 214 on the outer side of the substrate 210 is distributed in a denser manner compared with the convex portions 2122 on the inner side of the substrate 210, so that a favorable heat dissipation effect can be achieved. Preferably, the convex structures 2142 on the outer side of the substrate 210 is distributed in a denser manner compared with the convex portions 2122 on the inner side of the substrate 210. In one embodiment, as shown in FIG. 3B, a width W1 of each wave-shaped structure 214 perpendicular to the radial direction ranges from 2 mm to 7 mm. A width W2 between two adjacent convex portions 2122 perpendicular to the radial direction ranges from 1 mm to 5 mm.

In the embodiment, each convex portion 2122 satisfies TH/T<1, where TH is the height of each convex portion 2122. That is, the height of the convex portion 2122 is less than the thickness of the substrate 210 so as to attain a favorable heat dissipation effect. Moreover, a height TH of each convex portion 2122 ranges from 1 mm to 5 mm.

TABLE 1

|  | conventional wheel | wheel 200 | wheel 200A |
| --- | --- | --- | --- |
| maximum temperature (° C.) | 152.2 | 143.1 | 136 |
| increase rate of heat dissipation efficiency | 0% | 7.2% | 12.6% |

Table 1 illustrates the decrease in the maximum temperature and the increase rate of heat dissipation efficiency of the wheel 200 and the wheel 200A according to an embodiment of the disclosure relative to the conventional wheel. The conventional wheel is a wheel with no wave-shaped structure and no convex portions on the substrate. The maximum temperature of the conventional wheel is 152.2° C. Moreover, the conventional wheel is used as the benchmark for heat dissipation efficiency, and it is assumed that the increase rate of heat dissipation efficiency of the conventional wheel is 0%. Referring to Table 1, since the wave-shaped structure 214 is disposed on the wheel 200 of an embodiment of the disclosure, its maximum temperature is significantly reduced to 143.1° C., and the heat dissipation conversion efficiency is increased to 7.2%. Both the wave-shaped structure 214 on the outer side and the convex portion 2122 on the inner side are disposed on the wheel 200A. The maximum temperature of the wheel 200A is significantly reduced to 136° C., and the heat dissipation conversion efficiency is further increased to 12.6%.

Based on the above, in an embodiment of the disclosure, the convex portion 2122 is disposed between the optical layer 220 and the center C of the substrate 210 in the wheel 200A, so that the wheel 200A has both the inner convex portion 2122 on the inner side and the wave-shaped structure 214 on the outer side. Accordingly, the turbulence effect of the airflow may be increased, the heat dissipation effect of the wheel 200A is improved, and the overall conversion efficiency of the optical layer 220 is increased.

Figure 4A:
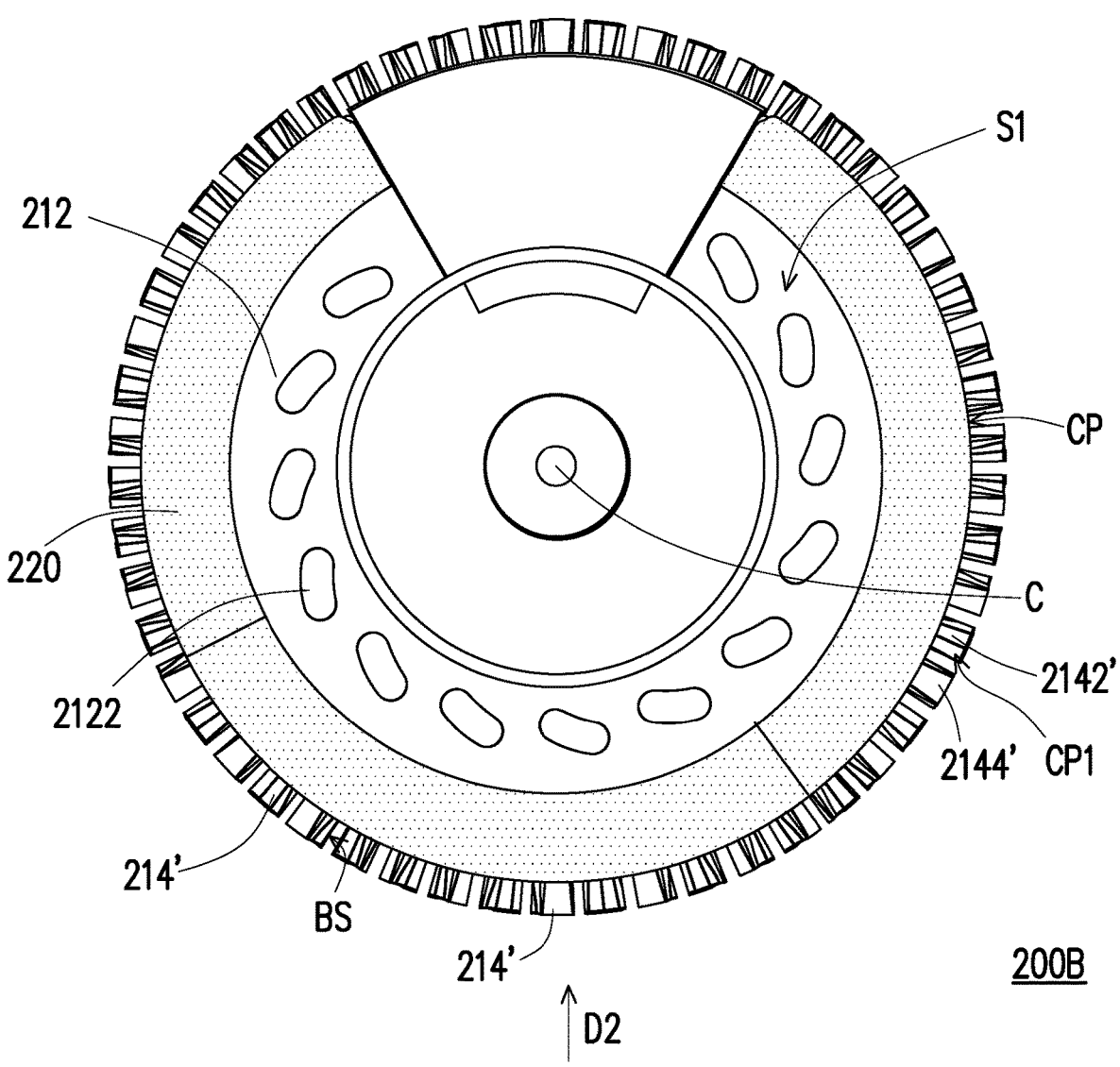
FIG. 4A is a schematic top view of a wheel according to a third embodiment of the disclosure.
Figure 4B:
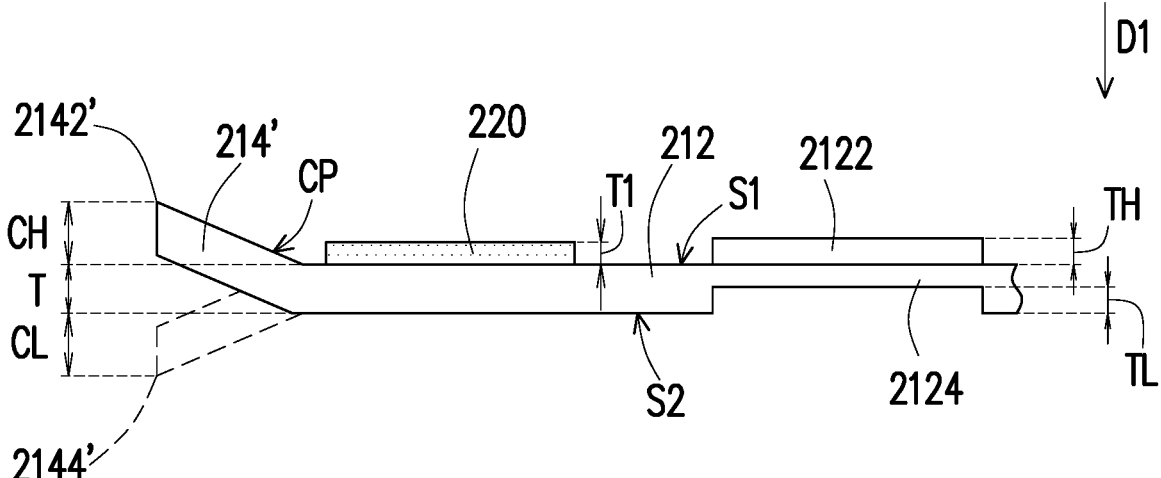
FIG. 4B is a schematic cross-sectional view of FIG. 4A.

FIG. 4A is a schematic top view of a wheel according to a third embodiment of the disclosure. FIG. 4B is a schematic cross-sectional view of FIG. 4A. Referring to both FIG. 4A and FIG. 4B, a wheel 200B is similar to the wheel 200A of FIG. 3A, and the main differences are as follows. In the embodiment, there is an opening BS between a second portion CP1 (e.g., a convex structure 2142') of a wave-shaped structure 214' and the adjacent wave-shaped structure 214' (e.g., a concave structure 2144'), so that the wave-shaped structure 214' is discontinuous in the direction perpendicular to (taking the center C as the center) the radial direction of the inner substrate 212. FIG. 4A illustrates that the radial direction of the wave-shaped structure 214' at the bottom is D2.

Specifically, for example, the opening BS between the wave-shaped structures 214' is generated when a distance CH between the convex structure 2142 and the extension of the first surface S1 exceeds the deformation range of the material of the substrate 210 during the stamping process.

Based on the above, in an embodiment of the disclosure, the wheel 200B has a design of the opening BS between the wave-shaped structures 214', and therefore the wave-shaped structure 214' is discontinuous. Accordingly, the discontinuous wave-shaped structure 214' has a stronger turbulence property. Along with the inner convex portion 2122, the heat source of the optical layer 220 is efficiently removed through the inner and outer structures, so that the temperature of the optical layer 220 is reduced, and the conversion efficiency of the optical layer 220 is improved.

In summary, in an embodiment of the disclosure, a wave-shaped structure is disposed at the outer side of the substrate in the wheel. When the wheel rotates at a high speed, the wave-shaped structure on the outer side guides the wind flow and the wind flow is blown effectively to the optical layer. The heat source of the optical layer is effectively removed, so that the temperature of the optical layer is reduced, and thereby the conversion efficiency of the optical layer is improved. Furthermore, since the wave-shaped structure is manufactured by stamping, the first portion of at least one of the wave-shaped structure connected to the inner substrate has a slope, and accordingly no additional heat sink is added in the mechanism. Even under high-speed rotation, there is no need to worry that the wave-shaped structure may be separated from the inner substrate. Moreover, with the wave-shaped structure as the reinforcing rib of the substrate, the structural strength of the outer side of the substrate may be improved. Accordingly, when the wheel rotates at a high speed, the oscillation generated at the outer side of the substrate is reduced, both the noise generated by the wheel and the damage to the motor configured to drive the wheel to rotate are reduced, and the life of the motor is improved.

In addition, the projection device of the disclosure uses the wheel, so in addition to the advantages, the energy generation efficiency of the projection device in the image beam is also improved.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A wheel, comprising a substrate and an optical layer, wherein the substrate comprises an inner substrate and a plurality of wave-shaped structures, wherein the inner substrate comprises a first surface and a second surface opposite to the first surface, the optical layer is disposed on the first surface, and an excitation beam is incident toward the optical layer; and the wave-shaped structures are connected to the inner substrate, and the wave-shaped structures are disposed around the inner substrate, wherein a first portion of at least one of the wave-shaped structures connected to the inner substrate comprises at least a slope, wherein along a direction from the first surface to the second surface, each of the wave-shaped structures is a convex structure or a concave structure and satisfies:

1≤CH/T≤3 or 1≤CL/T≤3, where CH is a largest distance between the convex structure and an extension of the first surface along the direction from the first surface to the second surface, CL is a largest distance between the concave structure and the extension of the second surface along the direction from the first surface to the second surface, and T is a thickness of the inner substrate along the direction from the first surface to the second surface.

2. The wheel according to claim 1, wherein the wave-shaped structures are connected to one another, and a second portion of the at least one of the wave-shaped structures connected to an adjacent wave-shaped structure comprises at least a slope.

3. The wheel according to claim 1, wherein the wheel satisfies:

CH>T1, where T1 is a thickness of the optical layer along the direction from the first surface to the second surface.

4. The wheel according to claim 1, wherein CH>CL.

5. The wheel according to claim 1, wherein a central angle occupied by each convex structure is less than a central angle occupied by each concave structure.

6. The wheel according to claim 1, wherein the first surface or the second surface comprises a plurality of convex portions, wherein the convex portions are disposed between the optical layer and the center and disposed around the center.

7. The wheel according to claim 6, wherein the wheel satisfies:

CH>TH or CL>TH, where TH is a height of each convex portion along the direction from the first surface to the second surface.

8. The wheel according to claim 6, wherein an extension of a line between each convex portion and the center passes through one of the wave-shaped structures.

9. The wheel according to claim 6, wherein a number of the wave-shaped structures is greater than a number of the convex portions, and a central angle occupied by each of the wave-shaped structures is less than a central angle occupied by each convex portion.

10. The wheel according to claim 6, wherein the second surface or the first surface comprises a plurality of concave portions opposite to the convex portions, wherein positions of the concave portions are respectively aligned with positions of the convex portions and satisfy:

TH=TL, where TH is a height of each convex portion along the direction from the first surface to the second surface, and TL is a depth of each concave portion along the direction from the first surface to the second surface.

11. The wheel according to claim 1, wherein there is an opening between a second portion of the one of the wave-shaped structures and an adjacent wave-shaped structure, so that the wave-shaped structures are discontinuous in a direction perpendicular to a radial direction of the inner substrate.

12. A projection device, comprising an illumination system, a light valve, and a projection lens, wherein the illumination system is configured to provide an illumination beam, the light valve is disposed on a transmission path of the illumination beam to convert the illumination beam into an image beam, the projection lens is disposed on a transmission path of the image beam to project the image beam out of the projection device, and the illumination system comprises a light source and a wheel, wherein the light source is configured to emit an excitation beam;

the wheel comprises a substrate and an optical layer;

the substrate comprises an inner substrate and a plurality of wave-shaped structures, wherein the inner substrate comprises a first surface and a second surface opposite to the first surface, the optical layer is disposed on the first surface, and the excitation beam is incident toward the optical layer; and the wave-shaped structures are connected to the inner substrate, and the wave-shaped structures are disposed around the inner substrate, wherein a first portion of at least one of the wave-shaped structures connected to the inner substrate comprises at least a slope, wherein along a direction from the first surface to the second surface, each of the wave-shaped structures is a convex structure or a concave structure and satisfies:

1≤CH/T≤3 or 1≤CL/T≤3, where CH is a largest distance between the convex structure and an extension of the first surface along the direction from the first surface to the second surface, CL is a largest distance between the concave structure and the extension of the second surface along the direction from the first surface to the second surface, and T is a thickness of the inner substrate along the direction from the first surface to the second surface.

13. The projection device according to claim 12, wherein the wave-shaped structures are connected to one another, and a second portion of the at least one of the wave-shaped structures connected to an adjacent wave-shaped structure comprises at least a slope.

14. The projection device according to claim 12, wherein a central angle occupied by each convex structure is less than a central angle occupied by each concave structure.

15. The projection device according to claim 12, wherein the first surface or the second surface comprises a plurality of convex portions, wherein the convex portions are disposed between the optical layer and the center and disposed around the center.

16. The projection device according to claim 15, wherein a number of the wave-shaped structures is greater than a number of the convex portions, and a central angle occupied by each of the wave-shaped structures is less than a central angle occupied by each convex portion.

17. The projection device according to claim 15, wherein the second surface or the first surface comprises a plurality of concave portions opposite to the convex portions, wherein positions of the concave portions are respectively aligned with positions of the convex portions and satisfy:

TH=TL, where TH is a height of each convex portion along the direction from the first surface to the second surface, and TL is a depth of each concave portion along the direction from the first surface to the second surface.

18. The projection device according to claim 12, wherein there is an opening between a second portion of the at least one of the wave-shaped structures and an adjacent wave-shaped structure, so that the wave-shaped structures are discontinuous in a direction perpendicular to a radial direction of the inner substrate.

\* \* \* \* \*